United States Patent
Miyashita et al.

(10) Patent No.: US 7,231,129 B2
(45) Date of Patent: Jun. 12, 2007

(54) INFORMATION REPRODUCTION APPARATUS AND INFORMATION REPRODUCTION METHOD

(75) Inventors: Masahiko Miyashita, Tokorozawa (JP); Takao Yamada, Tokorozawa (JP); Nobuo Ohyama, Tokorozawa (JP); Kazuo Kamei, Tokorozawa (JP); Eiji Kojima, Tokorozawa (JP); Toshio Ohtani, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 828 days.

(21) Appl. No.: 09/764,083

(22) Filed: Jan. 19, 2001

(65) Prior Publication Data

US 2001/0008574 A1 Jul. 19, 2001

(30) Foreign Application Priority Data

Jan. 19, 2000 (JP) .......................... P2000-014114

(51) Int. Cl.
*H04N 5/91* (2006.01)
(52) U.S. Cl. ..................... 386/46; 386/68; 386/95; 386/69; 386/70
(58) Field of Classification Search ........... 386/46, 386/68, 95, 69, 70; 369/47.54, 30.23, 60, 369/47.34
See application file for complete search history.

(56) References Cited

U.S. PATENT DOCUMENTS

| | | | | |
|---|---|---|---|---|
| 5,142,657 A | * | 8/1992 | Ezawa et al. | 704/276 |
| 5,377,051 A | * | 12/1994 | Lane et al. | 386/81 |
| 5,502,703 A | | 3/1996 | Yamada et al. | |
| 5,644,310 A | * | 7/1997 | Laczko et al. | 341/143 |
| 5,748,585 A | | 5/1998 | Kazuhito et al. | |
| 5,838,873 A | * | 11/1998 | Blatter et al. | 386/95 |
| 5,999,698 A | | 12/1999 | Takeshi et al. | |
| 6,201,928 B1 | * | 3/2001 | Nonomura et al. | 386/68 |
| 6,742,062 B2 | * | 5/2004 | Yamada et al. | 710/65 |
| 6,901,209 B1 | * | 5/2005 | Cooper et al. | 386/109 |
| 2001/0014073 A1 | * | 8/2001 | Yamada et al. | 369/84 |
| 2001/0026675 A1 | * | 10/2001 | Schultz et al. | 386/68 |

FOREIGN PATENT DOCUMENTS

| | | | |
|---|---|---|---|
| EP | 0 844 614 A | | 5/1998 |
| GB | 2328825 | * | 9/1997 |
| GB | 2 328 825 A | | 3/1999 |

\* cited by examiner

*Primary Examiner*—Thai Q. Tran
*Assistant Examiner*—Helen Shibru
(74) *Attorney, Agent, or Firm*—Sughrue Mion, PLLC

(57) ABSTRACT

An information reproduction apparatus which can perform repetitive reproduction is provided. In the apparatus, information recorded in an information storage medium is read. The read information is decoded. The decoded information is stored in a predetermined region of a storage device. During reproduction, information is sequentially read out and outputted in order of precedence at the time of writing the decoded information while the decoded information is stored in the predetermined region. When a start position of repetitive reproduction is designated, a repetition reproduction range is set. The repetition reproduction range is a range that would include the decoded information to be reproduced at one repetition reproduction. The decoded information is maintained in the repetition reproduction range. When an instruction to start the repetitive reproduction is provided, the decoded information in the repetition reproduction range is outputted and the decoded information subsequent to the repetition reproduction range is acquired.

18 Claims, 6 Drawing Sheets

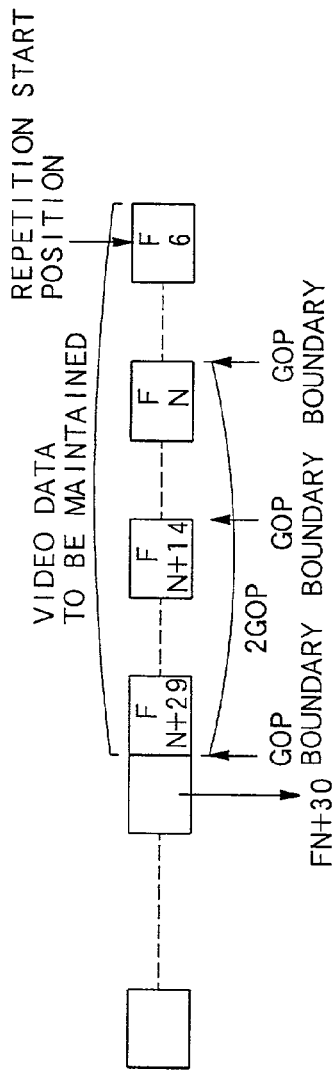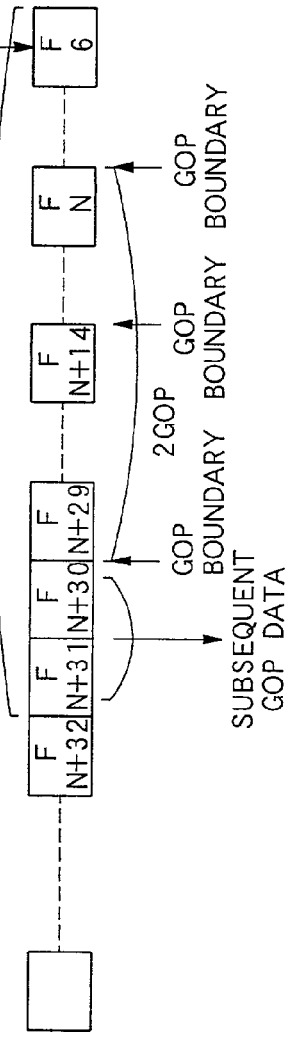
FIG. 5A
FIG. 5B
FIG. 5C

INFORMATION REPRODUCTION APPARATUS AND INFORMATION REPRODUCTION METHOD

BACKGROUND OF THE INVENTION

1. Field of the Invention

The present invention belongs to a technical field of an information reproduction apparatus and method for reproducing information such as audio or video using an information recording medium such as high density optical disc capable of recording information such as voice or image represented by DVD with high density.

2. Description of the Related Art

Conventionally, so called CD (Compact Disc), LD (Laser Disc) and the like are well employed in general as optical discs having information such as voice or image recorded therein.

In these CDs and the like, voice information and image information are recorded together with time information indicating a time at which respective items of information should be reproduced when a reproduction start position that each CD or the like has is defined as a reference. Thus, it is possible not only to cause general normal reproduction in which recorded information is reproduced in the recorded order, but also to extract and listen to only a desired music number of a plurality of recorded music numbers or to listen to the music number by randomly changing the reproduction order in a CD, for example.

Voice information and image information in a recording apparatus or reproduction apparatus for such CD or LD is handled in units of audio frames or video frames during recording, editing, and reproducing, and can be accessed in units of these frames.

In addition, in the CD or LD, it is possible to execute variable speed reproduction such as fast feed reproduction or slow reproduction is possible. Further, it is possible to speedily search a desired reproduction point or to carefully observe a desired reproduction point.

In the conventional apparatus, however, although a reproduction point is searched speedily, in the case where repetitive reproduction is specified at a predetermined reproduction interval during continuous reproduction of a dynamic image, the time required for the search is a sufficient time to lose continuity of the dynamic image. Therefore, in the case where repetitive reproduction is specified at a predetermined reproduction interval, there has been a problem that reproduction of the dynamic image is interrupted because of searching the repetitive reproduction start position.

In addition, a conventional repetitive reproduction start position is always set at the head of GOP. Thus, there has been a problem that displacement occurs between a user's desired repetitive reproduction position and an actually repetitively reproduced position. In order to solve this problem, it has been necessary to store an elapsed reproduction time when a repeat instruction is issued, and perform pseudo reproduction processing from the head of GOP to the elapsed reproduction time. Thus, there has been a problem that more time is required for reproduction.

SUMMARY OF THE INVENTION

The present invention has been made in view of the above-described problems. It is an object of the present invention to provide an information reproduction apparatus capable of, in the case where a repeat instruction is issued at the time of reproduction, performing repetitive reproduction from an exact position without losing continuity of a dynamic image.

The above object of the present invention can be achieved by an information reproduction apparatus as follows. The information reproduction apparatus is provided with: a reading device for reading information recorded in an information storage medium; a decoding device for decoding information read by the reading device; a storage device for holding decoded information decoded by the decoding device so that the decoded information can be read therefrom and written therein repeatedly; an output controlling device for sequentially reading out and outputting information in order of precedence at the time of writing the decoded information while writing the decoded information in a predetermined region of the storage device; a designating device for designating a repetitive reproduction start position; a repetitive reproduction controlling device for controlling a repetitive reproduction processing; a repetitive start instructing device for instructing the repetitive reproduction controlling device to begin to perform repetitive reproduction; and a repetition reproduction range setting device for setting a repetition reproduction range that would include the decoded information to be reproduced at one repetition reproduction and instructing the output controlling device to maintain the decoded information in the repetition reproduction range, when the start position of repetitive reproduction is designated by the designating device. Further, the repetitive reproduction controlling device instructs the output controlling device to output the decoded information in the repetition reproduction range and acquire the decoded information subsequent to the repetition reproduction range, when the repetitive reproduction controlling device is instructed to begin to perform the repetitive reproduction by the repetitive reproduction start instructing device.

According to the information reproduction apparatus, the reading device reads information recorded in an information storage medium. Then the decoding device decodes information read by the reading device. The decoded information is written in a predetermined region of the storage device by the output controlling device. Further, the output controlling device sequentially reads out and outputs information in order of precedence at the time of writing the decoded information while writing the decoded information in a predetermined region of the storage device. Then, a user can operate the designating device to designate a start position to start repetitive reproduction while the user is listening audio information or watching video information. If the user operates the designating device, the designating device designates a start position of repetitive reproduction. When the start position of repetitive reproduction is designated by the designating device, the repetition reproduction range setting device sets a repetition reproduction range that would include the decoded information to be reproduced at one repetition reproduction. Further, the repetition reproduction range setting device instructs the output controlling device to maintain the decoded information in the repetition reproduction range. Then, if the user operates the repetitive start instructing device, it instructs the repetitive reproduction controlling device to begin to perform repetitive reproduction. Then, the repetitive reproduction controlling device instructs the output controlling device to output the decoded information in the repetition reproduction range. Further, the repetitive reproduction controlling device instructs the output controlling device to acquire the decoded information subsequent to the repetition reproduction range.

Therefore, repetitive reproduction from the designated start position can be performed momentously after an instruction to begin to perform repetitive reproduction is provided. Further, the decoded information subsequent to the repetition reproduction range is acquired, so that the subsequent reproduction is performed without intermittence.

In one aspect of the information reproduction apparatus, the repetition reproduction range setting device sets a range from a target position on the storage device as the repetition reproduction range. The target position is a position from which the decoded information is read at the time when the start position is designated. Further, when the start position is designated, the repetition reproduction range setting device instructs the output controlling device to use an area except the repetition reproduction range for reading and writing area of the decoded information. Moreover, when the output controlling device is instructed to acquire the decoded information subsequent to the repetition reproduction range, the repetitive reproduction controlling device instructs the output controlling device to begin to read out the decoded information from the target position on the storage device to an end of the repetition reproduction range. Further, the repetitive reproduction controlling device instructs the reading device to read the information, the decoding device to decode the read information, and the output controlling device to write the decoded information in the area except the repetition reproduction range.

According to this aspect, the decoded information is written in the area except the repetition reproduction range. Therefore, the decoded information in the repetition reproduction range is maintained in the storage device without being overwritten. Further, after repetition reproduction using the decoded information in the repetition reproduction range is finished, the subsequent reproduction is performed without intermittence.

In another aspect of the information reproduction apparatus, the repetitive reproduction range setting device sets the size of the repetition reproduction range so that both reading information corresponding to the decoded information subsequent to the repetition reproduction range in the reading device and decoding the read information in the decoding device can be completed while the decoded information in the repetition reproduction range is outputted.

According to this aspect, after repetition reproduction using the decoded information in the repetition reproduction range is finished, the subsequent reproduction is performed without intermittence.

In another aspect of the information reproduction apparatus, the information recorded on the information storage medium is video compression information that includes first image information for intra-frame encoding and second image information for performing forward and backward prediction. Further, the repetition reproduction range setting device instructs the output controlling device to maintain both the decoded information that corresponds to one processing unit of the video compression information and the decoded information that corresponds to the second image information immediately before the first image information that is first appeared in a processing unit subsequent to the one processing unit, as decoded information in the repetition reproduction range.

According to this aspect, in case where there is the second image information that spreads over two processing units, the second image information is appropriately decoded and is stored in the storage device as the decoded information in the repetition reproduction range. As a result, whole information is appropriately decoded, it is possible to prevent reproduction image from stopping.

The above object of the present invention can be achieved by an information reproduction method as follows. The information reproduction method is provided with the processes of: reading information recorded in an information storage medium; decoding read information; holding decoded information in a storage device so that the decoded information can be read therefrom and written therein repeatedly; sequentially reading out and outputting information in order of precedence at the time of writing the decoded information while writing the decoded information in a predetermined region of the storage device; designating a repetitive reproduction start position; setting a repetition reproduction range that would include the decoded information to be reproduced at one repetition reproduction when the start position of repetitive reproduction is designated; maintaining the decoded information in the repetition reproduction range when the start position of repetitive reproduction is designated; providing an instruction to begin to perform repetitive reproduction; outputting the decoded information in the repetition reproduction range when the instruction is provided; and acquiring the decoded information subsequent to the repetition reproduction range when the instruction is provided.

According to the information reproduction method, information recorded in an information storage medium is read. Then read information is decoded. The decoded information is written in a predetermined region of the storage device. Further, information is sequentially read out and outputted in order of precedence at the time of writing the decoded information while the decoded information is written in the predetermined region of the storage device. Then, a user can designate a start position of repetitive reproduction while the user is listening audio information or watching video information. If the user designates the start position, a repetition reproduction range is set. The repetition reproduction range is a range that would include the decoded information to be reproduced at one repetition reproduction. Further, the decoded information is maintained in the repetition reproduction range. Then, if the user provides an instruction to start repetitive reproduction, the decoded information in the repetition reproduction range is outputted. Further, the decoded information subsequent to the repetition reproduction range is acquired.

Therefore, repetitive reproduction from the designated start position can be performed momentously after an instruction to begin to perform repetitive reproduction is provided. Further, the decoded information subsequent to the repetition reproduction range is acquired, so that the subsequent reproduction is performed without intermittence.

In one aspect of the information reproduction method, when the repetitive reproduction start position is designated, an area except the repetition reproduction range is used for reading and writing area of the decoded information. Further, when the repetitive reproduction start position is designated, a range from a target position on the storage device is set as the repetition reproduction range. The repetition reproduction range is a range from which the decoded information is read at the time when the start position is designated. Then, when the instruction is provided, the decoded information is read out from the target position on the storage device to an end of the repetition reproduction range. Then, when the decoded information subsequent to the repetition reproduction range is acquired, the information is read from the information recording medium, the read information is decoded, and the decoded information is written in the area except the repetition reproduction range.

According to this aspect, the decoded information is written in the area except the repetition reproduction range. Therefore, the decoded information in the repetition reproduction range is maintained in the storage device without being overwritten. Further, after repetition reproduction using the decoded information in the repetition reproduction range is finished, the subsequent reproduction is performed without intermittence.

In another aspect of the information reproduction method, the size of the repetition reproduction range is set so that both reading information corresponding to the decoded information subsequent to the repetition reproduction range and decoding the read information can be completed while the decoded information in the repetition reproduction range is outputted.

According to this aspect, after repetition reproduction using the decoded information in the repetition reproduction range is finished, the subsequent reproduction is performed without intermittence.

In another aspect of the information reproduction method, the information recorded on the information storage medium is video compression information that includes first image information for intra-frame encoding and second image information for performing forward and backward prediction. Further, when the repetition reproduction range is set, both the decoded information that corresponds to one processing unit of the video compression information and the decoded information that corresponds to the second image information is maintained as decoded information in the repetition reproduction range. The second image information exists immediately before the first image information that is first appeared in a processing unit subsequent to the one processing unit.

According to this aspect, in case where there is the second image information that spreads over two processing units, the second image information is appropriately decoded and is stored in the storage device as the decoded information in the repetition reproduction range. As a result, whole information is appropriately decoded, it is possible to prevent reproduction image from stopping.

BRIEF DESCRIPTION OF THE DRAWINGS

FIG. 5A is a block diagram showing an example of data that is maintained as a repetitive reproduction range;

FIG. 5B is a block diagram showing an example of data when the data of GOP that follows a repetitive reproduction range is decoded in an open GOP format;

FIG. 5C is a block diagram showing an example of data that is maintained as a repetitive reproduction range in an open GOP format in the second embodiment of the present invention.

DETAILED DESCRIPTION OF THE PREFERRED EMBODIMENTS

Hereinafter, preferred embodiments of the present invention will be described with reference to the accompanying drawings.

Figure 1:
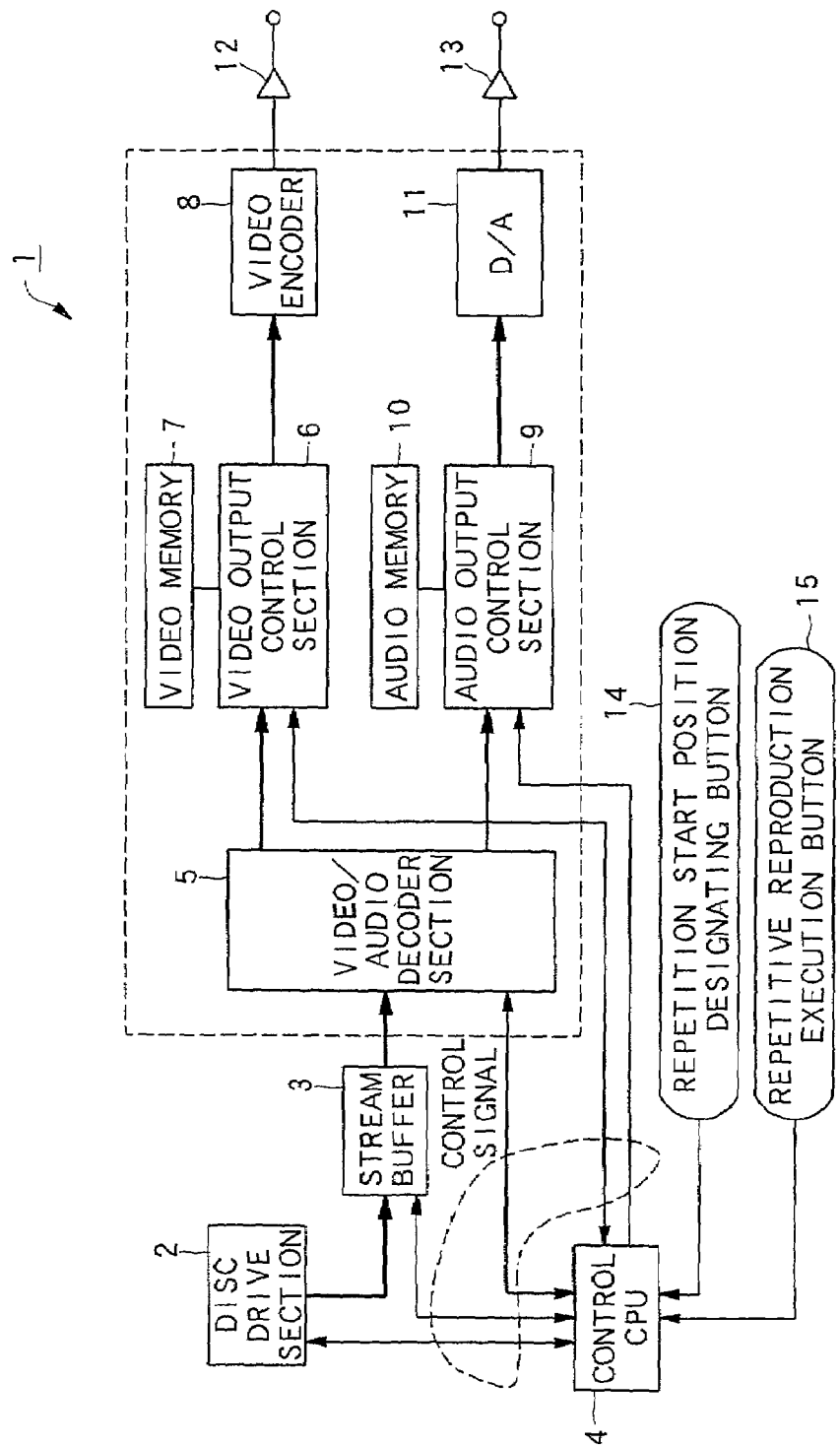
FIG. 1 is a block diagram showing a general configuration of an information reproduction apparatus in a first embodiment of the present invention.

FIG. 1 is a block diagram showing a general configuration of a DVD reproduction apparatus as an example of an information reproduction apparatus in the present embodiment.

As shown in FIG. 1, a DVD reproduction apparatus 1 is composed of: a disc drive section 2; a stream buffer 3; a control CPU 4; a video/audio decoder section 5; a video output control section 6; a video memory 7; a video encoder 8; an audio output control portion 9; an audio memory 10; a D/A converter 11; amplifiers 12 and 13; a repetition start position designating button 14; and a repetition reproduction execution button 15.

The disc drive section 2 is means for extracting data from a DVD. This section is composed of, for example, a spindle motor, a slider motor, a drive controller, a pickup, a modulation correction section and the like, which are not shown in the figure. The pickup includes, for example, a laser diode, a deflection beam splitter, an object lens, an optical detector and the like, which are not shown in the figure. The pickup irradiates the DVD (not shown) with a light beam as reproduction light, receives the reflection light from the DVD of the light beams, and outputs a detection signal corresponding to an information pit formed on the DVD. At this time, an information track on the DVD is exactly irradiated with the light beam. In addition, a control signal is outputted to the spindle motor and the slider motor by means of the drive controller so as to exactly connect a focal point on an information recording face on the DVD, and tracking servo control and focus servo control are performed to the object lens. Further, a detection signal outputted from the pickup is inputted to the demodulation correction section, demodulation processing and error correction processing are performed, and a modulation signal is generated, and then, is outputted to the stream buffer 3.

The stream buffer 3 is means for temporarily storing composite stream data such as video or audio compressed in accordance with the MPEG2 (Moving Picture Expert Group 2) system. This buffer is composed of RAM of FIFO (First In First Out) and the like.

In the DVD video standards, composite stream data is composed in reproduction units called cells having ID numbers assigned thereto. Further, each cell is composed of one or more information units called VOBU (Video Object Unit). One VOBU has a reproduction time of 0.4 second to 1 second. A navigation pack having search information recorded therein for reproduction and information concerning reproduction control is always placed at the head of the VOBU. Then, video data, audio data, subsidiary picture data and the like, each corresponding to integer number of GOPs (Group Of Picture) are packed, and are inserted by time division.

Here, GOP is a minimum unit of image that can be reproduced solely in the standards of the MPEG2 system, and video data is composed of one or more GOPs. In addition, a variable rate system in which a quantity of data contained in each GOP is not constant is adopted in the MPEG2 system. Thus, in the DVD apparatus 1, a difference in the amount of data between GOPs is compensated for by using the stream buffer 3.

In addition, in the DVD, there is a case in which one cell is recorded to be divided into a plurality of units called interleaved unit. In this case, only interleaved units that configures cells of the same ID numbers are continuously detected and reproduced while causing track-jump from one interleave unit to another interleaved unit. One interleaved unit has a reproduction time in which data can be continuously outputted from the stream buffer 3, even if data input to the stream buffer 3 is stopped by the pickup jumping from one interleaved unit to another interleaved unit. The DVD reproduction apparatus 1 is configured so as to continuously output data discontinuously inputted to the stream buffer 3 in every interleaved unit by using the stream buffer 3. With such configuration, cells of discrete ID numbers can be reproduced seamlessly.

In addition, an output of the composite stream data from the stream buffer 3 to the video/audio decoder section 5 is controlled by means of the control CPU 4 so that decode processing is not interrupted when the buffers in the video/audio decoder section 5 overflow or become empty.

A control CPU 4 is a means for outputting a control signal to each of a drive controller of the disc drive section 2, the stream buffer 3, the video/audio decoder section 5, the video output control section 6, and the audio output control section 9, and controlling operation of each section. In addition, this CPU is a means for setting a repetition start position described later according to an input of a repetition start position designating button 14, and for controlling repetitive reproduction processing described later according to an input of a repetitive reproduction execution button 15.

The video/audio decoder section 5 is a means for decoding composite stream data outputted from the stream buffer 3 to video data, audio data, and subsidiary picture data.

The video decoder 5 in the present embodiment is composed of, for example, a de-multiplexer, a video buffer, an audio buffer, a subsidiary picture buffer, a video decoder, an audio decoder, a subsidiary picture decoder and the like, which are not shown in figures, in order to decode the video data, the audio data and the subsidiary picture data described above.

The de-multiplexer separates the video data, the audio data, and the subsidiary picture data from the composite stream data, and outputs them to the video buffer, the audio buffer, and the subsidiary picture buffer, respectively.

The audio data includes linear PCM (Pulse Code Modulation) using a sampling frequency of 48 kHz, MPEG audio, or Dorby AC-3 (Dolby Audio Code number 3). The audio buffer having the audio data inputted thereto is composed of a FIFO memory or the like, temporarily stores the input audio data, and outputs the stored data to the audio decoder. The audio decoder demodulates the audio data, and outputs the demodulated audio data to the audio output control portion 9

The subsidiary picture data defines data superimposed on a main video such as subtitle, menu, words display of karaoke by a bit map, and is compression-coded by a run length system. The subsidiary picture buffer having the subsidiary picture data inputted thereto temporarily stores the inputted subsidiary picture data, and outputs the stored data to the subsidiary picture decoder. The subsidiary picture buffer outputs subsidiary picture information included in the subsidiary picture data in synchronism with image information corresponding to the subsidiary picture information. Then, the subsidiary picture data synchronized with the image information is inputted to the subsidiary picture decoder, is decoded, and is inputted to the video output control section 6 as decoded subsidiary picture data.

Figure 2A:
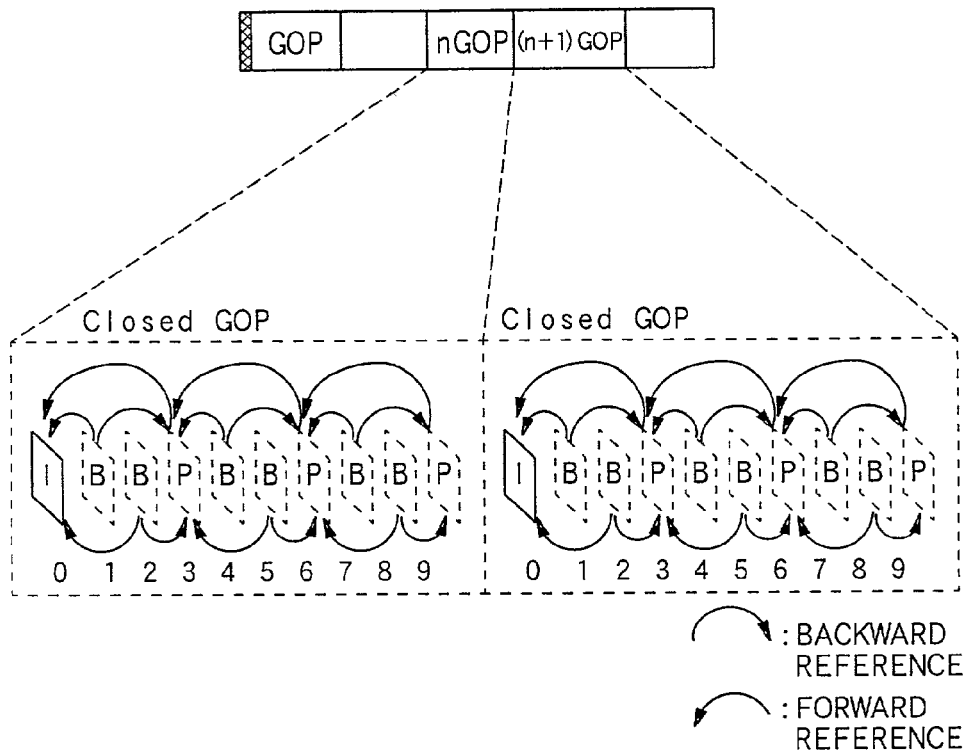
FIG. 2A is a view showing a closed GOP.

The video data is compression-coded by means of the MPEG2 system, and is composed of an information unit called a video pack. This video pack is further composed of one or plural GOPs described above. FIG. 2A shows a case in which one GOP 20 is composed of 10 frame images converted to a reproduction time of about 0.5 second. However, the number of frame images is principal, and the number of frame images included in one GOP is not constant in the MPEG2 system.

Figure 2B:
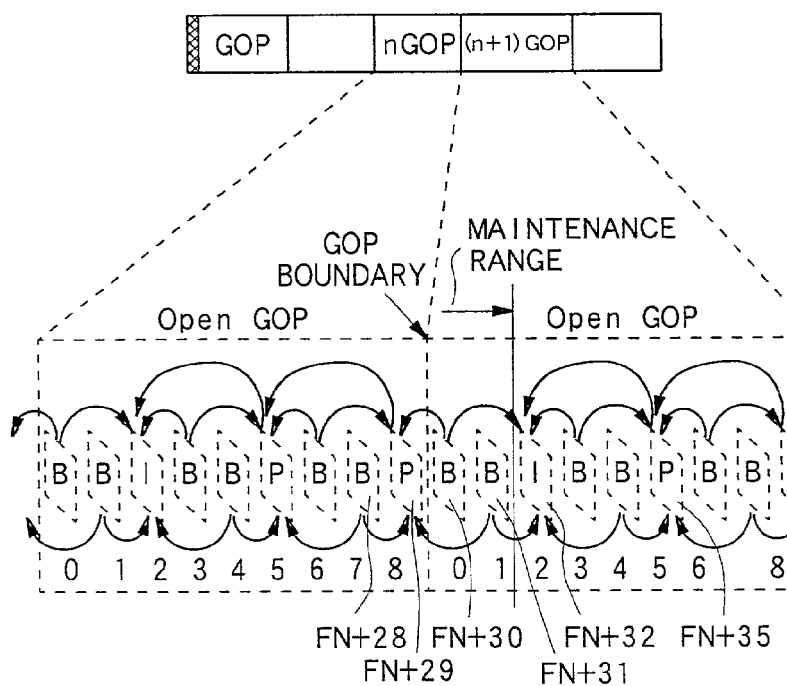
FIG. 2B is a view showing an open GOP.

In FIGS. 2A and 2B, a frame image indicated by a symbol I is called I picture (Intra-coded picture), and a complete frame image can be reproduced by only its image.

In addition, a frame image indicated by a symbol P is called P picture (Predictive-coded Picture), and is generated by forward predictive-coding processing. The forward predictive-coding processing is processing for creating a predictive image on the basis of an image to be decoded prior to a current image targeted for encoding, and encoding a difference between this predictive image and the current image targeted for encoding. If an image is recorded in the DVD after encode processing, decoding is performed in accordance with a recording sequence in the DVD when the image is reproduced. The "image to be decoded prior to" means an image in which the decoding sequence is precedent with an elapse of time. In addition, the predictive image is an image created by decoding a picture encoded previously, and performing movement compensation for the decoded image. In the case where the P picture is encoded, predictive image is created based on the previously encoded I picture or P picture.

Further, a frame image indicated by a symbol B is called B picture (Bidirectionally predictive-coded picture), and is produced by predictive coding processing over the forward and backward directions. The backward predictive coding processing is processing for creating a predictive image on the basis of an image to be decoded more successively than a current image targeted for encoding, and encoding a difference between this predictive image and the current image targeted for encoding. Here, "an image to be decoded more successively" means an image in which the sequence of decoding after recording onto the DVD, for example, is successive after an elapse of time. Namely, in the case where the B picture is encoded, two predictive images are created, respectively, based on two images, which are composed of the I pictures or the P pictures or I and P pictures encoded previously, in which the sequence of decoding after recording onto the DVD is precedent and successive after an elapse of time.

In FIG. 2A, a predictive relationship (compensation relationship) between pictures is indicated by the arrow described at the upper and lower parts of each picture. Here, the predictive relationship means a relationship between an image targeted for predictive coding processing and a reference image. Predictive coding processing is processing in which a signal value of an image is presented by using a difference between the signal values of the precedent or successive images after an elapse of time. The aforementioned I picture is created by intra-frame predictive encoding (intra-coding) in which a predictive memory is not employed. The P picture is created by forward intra-frame prediction using one prediction memory, and the B picture is created by bidirectional intra-frame prediction using two prediction memories.

The video buffer temporarily stores the above video data, and outputs it to the video decoder. The video buffer is intended to compensate for dispersion in the amount of data for each picture in the video data compressed by the MPEG2 system. Then, the video data for which the dispersion in the amount of data has been compensated is inputted to the video decoder, is decoded by means of the MPEG2 system, and is inputted as decoded video data to the video output control section 6.

The video output control section 6 is a control section for temporarily storing video data outputted from the video/audio decoder section 5 in the video memory 7, and outputting a video frame in accordance with a system bit rate.

The video encoder 8 encodes a video frame outputted from the video output control section 6 into data in display format such as PAL system, NTSC system or RGB system, and outputs the encoded video frame. The encoded data is outputted via the amplifier 12.

Next, an audio output control section 9 is a control section for temporarily storing audio data outputted from the video/audio decoder section 5 in the audio memory 10, and outputting an audio frame at a predetermined bit rate.

A D/A converter 11 converts digital audio data outputted from the audio output control section 9 into analog data, and outputs the converted analog data. The converted data is outputted via the amplifier 13.

The repetition start position designating button 14 is a button employed for designating a position to be repeated while the user is observing a video image. When the user presses this button, the control CPU 4 sets the repetition start position.

The repetition reproduction execution button 15 is a button to be pressed when the user wants to execute repetitive reproduction. When the user presses this button, the control CPU 4 starts repetitive reproduction processing from the set repetition start position.

The description of the general configuration of the DVD reproduction apparatus according to the present embodiment has now been completed.

(Repetitive Reproduction Processing)

Figure 3:
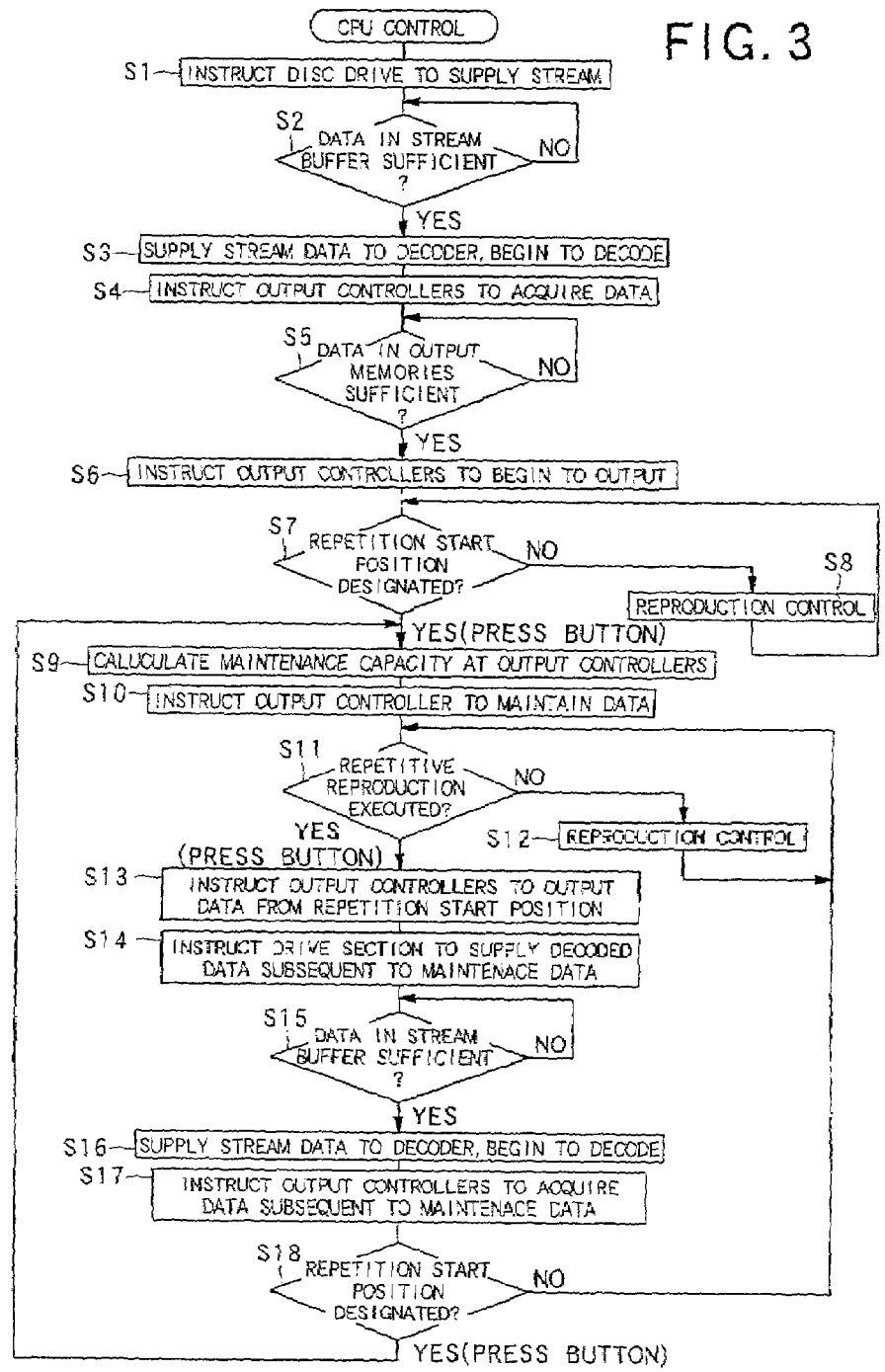
FIG. 3 is a flowchart showing repetitive reproduction processing in the information reproduction apparatus shown in FIG. 1.

Now, repetitive reproduction processing in the DVD reproduction apparatus according to the present invention will be described with reference to a flowchart shown in FIG. 3 and a timing chart shown in FIG. 4.

First, when the control CPU 4 is instructed to start a repetitive operation by pressing a reproduction switch or the like (not shown), the control CPU 4 instructs the disc drive section 2 to supply a composite data stream (step S1).

In this manner, the disc drive section 2 starts the supply of the composite data stream to the stream buffer 3, and the composite data stream is stored in the stream buffer 3. Accordingly, the control CPU 4 determines whether or not sufficient amount of data is stored for seamless reproduction in the stream buffer 3 (step S2).

In the case where it is determined that a sufficient amount of data has been stored in the stream buffer 3 after an elapse of a predetermined time, for example, the control CPU 4 instructs the video/audio decoder section 5 to begin to decode. At the same time, a time stamp of a video frame and a time stamp of an audio frame are acquired from data stored in the stream buffer 3 (step S3). In this manner, the video audio decoder section 5 begins to decode video data and audio data, decompresses and decodes data compressed and encoded in accordance with the MPEG2 system, and outputs video frame and audio data.

Next, the control CPU 4 instructs the video output control section 6 and the audio output control section 9 to begin to acquire a video frame and audio data while data transfer and control are performed from the video audio decoder section 5 to the video output control section 6 and the audio output control section 9 (step S4).

The video output control section 6 receiving this instruction acquires a video frame outputted from the video/audio decoder section 5, and stores the video frame in the video memory 7.

In addition, in the audio output control section 9 receiving the instruction as well, audio data outputted from the video/audio decoder section 5 is acquired, and audio data is stored in the audio memory 10. The control CPU 4 controls the video output control section 6 and the audio output control section 9 so that audio data is outputted in synchronism with a video frame based on a time stamp of audio data and a time stamp of the video frame acquired by processing at the step S3.

Here, a mode of using the video memory 7 and the audio memory 10 in the video output control section 6 and the audio output control section 9 will be described with reference to FIG. 4. Although a case of the video memory 7 is shown in FIG. 4, the basic idea is similar to a case of the audio memory 10.

The video memory 7 and audio memory 10 use all or part of the memory area as a loop memory, and outputs them in stored order. In an example shown in FIG. 4A, a part of the memory area is used as a loop memory, and video frames up to F2, F3, . . . , FN+1 is stored in ascending order from F1. In this case, video frames are outputted in order of F1, F2, and F3, and new data is stored so that FN+2 is stored in an area having F1 stored therein, FN+3 is stored in an area having F2 stored therein, and FN+4 is stored in an area having F3 stored therein.

Next, the control CPU 4 determined whether or not data sufficient for reproduction is stored based on the amount of data and the time stamp stored in the video memory 7 and the audio memory 10 (step S5).

As a result of the determination, when it is determined that the sufficient data is not stored in the video memory 7 and audio memory 10 (step S5: NO), the processing is switched to standby state until the sufficient data has been stored. However, when it is determined that the sufficient data has stored in the video memory 7 and audio memory 10 (step S5: YES), the control CPU 4 instructs the video output control section 6 and the audio output control section 9 to begin to output the data based on the video frame and the time stamp of audio data (step S6).

In this manner, after a video frame has been encoded by means of the video encoder 8, the encoded frame is reproduced and outputted via the amplifier 12. In addition, after audio data has been converted into analog data by means of the D/A converter 11, the converted analog data is reproduced and outputted via the amplifier 13.

Next, during reproduction output, the control CPU 4 determines whether or not the repetitive start position designating button 14 has been pressed (step S7). In the case where the button is not pressed (step S7: NO), general reproduction control is continued (step S8).

The user can designate a repetition start position by pressing the repetition start position designating button during pause as well as during reproduction.

However, in the case where the repetition start position designating button 14 is pressed (Step S7: YES), an amount of data required for performing reproduction for a predetermined time from the start of repetition is calculated as a storage capacity in the memory (step S9). Namely, the capacity of a maintenance area for maintaining the contents of part or all of the memory area that has been used as a loop memory is calculated.

This is because, within a predetermined period from the start of repetition, the DVD reproduction apparatus 1 according to the present embodiment performs reproduction using data maintained in the memory; reads data following the maintained data; decodes the maintained data; and stores the decoded data in the memory storage during the reproduction. Therefore, the maintenance capacity is calculated so that a time of reproducing data to be maintained is a time sufficient to complete the following operation: reading data following data to be maintained, decoding the data, and storing the data in the memory storage. In addition, the range of data to be maintained includes data at the repetition start position, and is set in a range that includes up to the last data of at least one GOP. In this manner, search of data following data to be maintained can be performed in units of GOP, and a processing time can be reduced.

When calculation of the maintenance capacity terminates, the control CPU 4 instructs the video output control section 6 and audio output control section 9 to maintain data corresponding to the maintenance capacity as an initial reproduction range (repetition reproduction range) (step S10).

Figure 4A:
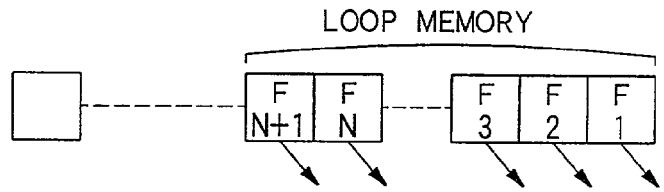
FIG. 4A is a block diagram showing a method of using a memory during general reproduction in the information reproduction apparatus shown in FIG. 1.
Figure 4B:
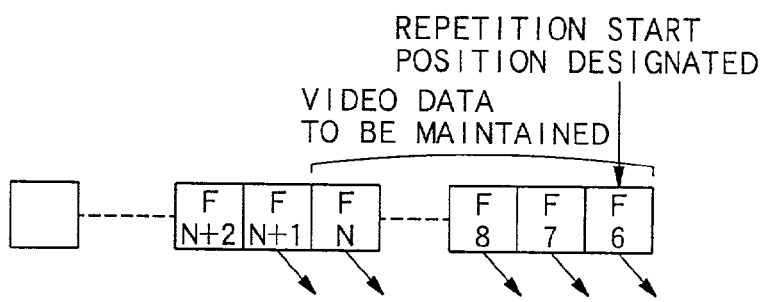
FIG. 4B is a block diagram showing a method of using a memory when data is maintained as an initial reproduction range at the time of designation of a repetitive start position.

In an example shown in FIG. 4B, assume that video frames of F6, F7 . . . , FN+2 are stored, and a repetition start position is designated at an output timing of the video frame of F6. In this case, for example, an area for storing video frames of F6 to FN is set as the initial reproduction range, outputs of the video frames are performed in ascending order from F6 to FN. However, no new data is written in an area from which the video frames of F6 to FN have been outputted. Then, the other area is used as a loop memory, and video frames subsequent to FN+2 are stored in the other area. In normal reproduction, after FN is outputted, a video frame of FN+1 is outputted instead of the video frames of F6. This applies to audio data as well.

Then, the control CPU 4 determines whether or not the repetition reproduction execution button 15 has been pressed (step S11). In the case where the button is not pressed (step S11: NO), repetitive control is continued (step S12). Therefore, in the area used as a loop memory, as described above, video frames and audio data are stored, and are outputted in order.

Figure 4C:
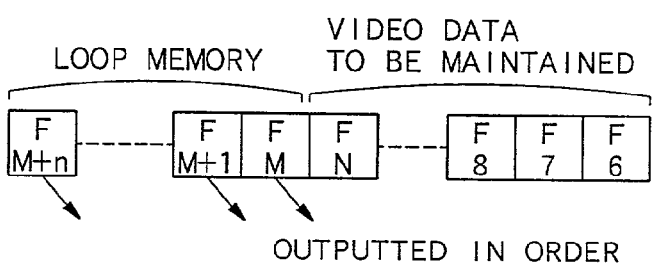
FIG. 4C is a block diagram showing a method of using a memory when new data is stored in a state in which data is maintained as a repetitive reproduction range.

In an example shown in FIG. 4C, video frames of FM to FM+n are stored in the area used as a loop memory, and are outputted in order. However, video frames of F6 to FN that are within the initial reproduction range are not outputted, and are maintained as they are.

In the case where the repetition reproduction execution button 15 is pressed (step S11: YES), the control CPU 4 instructs the video output control portion 6 and audio output control portion 9 to output data within the initial reproduction range from the repetition start position (step S13).

Figure 4D:
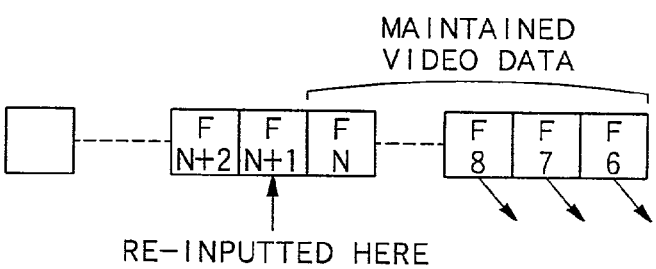
FIG. 4D is a block diagram showing a method of using a memory when repetitive reproduction is executed.

In an example in FIG. 4D the video output control section 6 outputs video frames from F6 to FN in order. Therefore, video images from the repetition start position are reproduced immediately after the repetition reproduction execution button 15 has been pressed, and reproduction of audio data synchronized with such reproduction of video images is performed.

On the other hand, the control CPU 4 instructs the disc drive section 2 to supply encoding data subsequent to video frames of F6 to FN in the initial reproduction range (step S14). As described above, the data maintained in the maintenance area includes the last data of at least one GOP. Thus, the CPU issues an instruction so as to supply a GOP that follows the GOP.

Accordingly, the disc drive section 2 searches a position of the instructed GOP, reads encoding data, and outputs the data to the stream buffer 3. The control CPU 4 determines whether or not a sufficient amount of data has been stored in the stream buffer 3 as in the case of step S2 (step S15). In the case where it is determined that the data has been stored (step S15: YES), stream data is supplied to the video/audio decoder section 5, and decoding is begun (step S16). Then, the control CPU 4 instructs the video output control portion 6 and audio output control portion 9 to acquire data subsequent to the maintenance data (step S17).

As a result, as shown in FIG. 4D, video frames of FN+1, FN+2, . . . that follow a video frame of EN that is last data of the maintenance area are stored, and are reproduced sequentially. Therefore, after all the video frames of the maintenance areas have been outputted, video frames that follow these video frames are outputted. Thus, repetitive reproduction is performed smoothly without stoppage or intermittence of video images, and repetitive reproduction is performed smoothly. This applied to audio data as well.

Hereinafter, while it is determined whether or not a new repetition start position is designated (step S18), repetition processing is continued (step S18: NO to step S11: NO). If an instruction of the execution of repetitive reproduction is provided again (step S11: YES), processing from the step S13 is repeated. Thus, repetitive reproduction from the firstly designated start position is performed any time every time the repetitive reproduction execution button 15 is pressed. In addition, in the case where a new repetition start position has been designated (step S18: YES), processing from the step S9 is performed. Thus, new data is written in the initial reproduction range, and video frames in the new range are reproduced in repetitive manner by pressing the repetition reproduction button 15 (step S11: YES).

As described above, according to the present embodiment, repetitive reproduction processing from the designated position can be performed momentously after the repetition reproduction execution button 15 has been pressed, and further, the subsequent reproduction is performed without intermittence.

(Second Embodiment)

Now, a second embodiment of the present invention will be described with reference to FIGS. 2 and 5.

In the first embodiment, in the initial reproduction range, arrangement is provided so as to include up to last data of at least one GOP from the repetition start position.

However, in the case where compression and encoding data in accordance with the MPEG2 system recorded in a DVD are in so called open GOP form, as shown in FIG. 2B, the first data in the subsequent GOP is constructed based on data of the previous GOP. Thus, when arrangement is provided as in the first embodiment there occurs a case in which data that follows the initial reproduction range is not decoded properly when repetitive reproduction is executed.

For example, as shown in FIG. 5A, video frames of F6 to FN+29 are set the initial reproduction range. When repetitive reproduction is executed, the control CPU 4 begins to read and decode data from the DVD in order to obtain video frames subsequent to FN+30 that follow the video frame of FN+29 while the video frames of F6 to FN+29 is reproduced.

For example, if the video frames of F6 to FN+29 belong to nGOP, as shown in FIG. 2B, and the video frames subsequent to FN+30 belong to (n+1) GOP, the frame of B picture of FN+31 is decoded by referring to P picture of the last FN+29 of nGOP.

However, when repetitive reproduction is executed, the data on nGOP has been already decoded, and has been rewritten in the memory. Thus, the data cannot be referred to, and the frames of B pictures of the first FN+30 and FN+31 cannot be decoded.

In such case, many decoders are configured so as to substitute the data that can be first decoded as data of a frame that could not be decoded. Therefore, in this case, as shown in FIG. 5B, decoded data of I picture of FN+32 that can be first decoded in (n+1) GOP is substituted as data of FN+30 and FN+31. As a result, images are stopped in the first some frames in (n+1) GOP.

In the present embodiment, in the case where compression and encoding data is composed in the open GOP format, the repetition start position is designated. When the initial reproduction range is set, B picture frames up to the first I picture frame in the next GOP are configured so as to be decoded at a time and written as the data in the initial reproduction range in the memory.

For example, in the case of FIG. 2B, a range in which the data in the initial reproduction range is maintained is extended up to the range indicated by a solid line in FIG. 2B. As a result, when the data following the initial reproduction range is decoded, there is no need for the frames of the first two B pictures in (n+1) GOP to be newly decoded and reproduced.

Then, when repetitive reproduction is executed, and decoding of (n+1) GOP is performed, the decoded data subsequent to the first I picture in (n+1) GOP is acquired in the memory. As a result, as shown in FIG. 5C, the data is continuously reproduced, following the initial reproduction range.

As has been described above, according to the present embodiment, even in the case where compression and encoding data is in the open GOP format, continuous repetitive reproduction free of image stoppage can be performed.

In the second embodiment, although there has been the open GOP in which the B pictures of the first 2 frames in (n+1) GOP refers to the frame in the nGOP, the number of B pictures is not limited to 2 frames. The present invention is also applicable to an open GOP having B pictures of 2 frames or more.

(Third Embodiment)

Now, a third embodiment of the present invention will be described with reference to FIG. 6.

Figure 6:
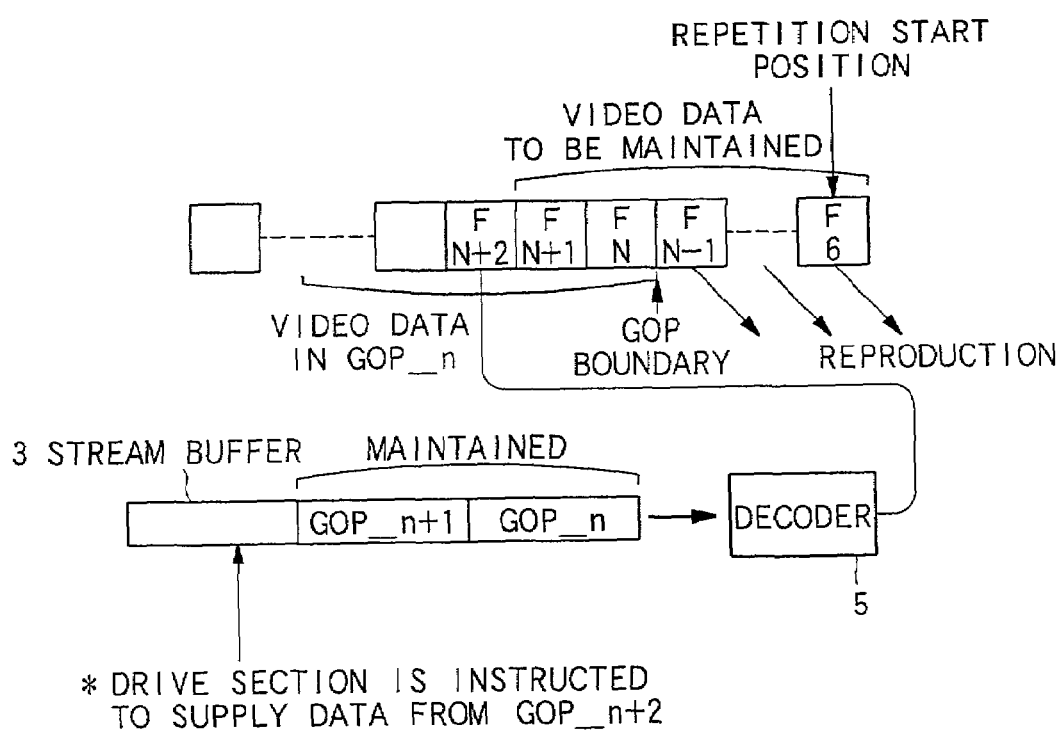
FIG. 6 is a block diagram showing data in the memory and stream buffer when GOP that follows a repetitive reproduction range is maintained in the stream buffer in the third embodiment of the present invention.

The present embodiment shows an example in which, when a repetition start position is designated, and the initial reproduction range is set, the GOP that has not been decoded yet and follows the initial reproduction range is maintained in the stream buffer 3, as shown in FIG. 6.

With such configuration, the acquisition time of decoded data that follows the initial reproduction range can be reduced. Thus, an amount of data that is maintained as an initial reproduction range in the video memory 7 and audio memory 10 can be decreased.

For example, assuming that a seek time of the disc drive section 2 is defined as about 1 second, as an example shown in FIG. 6, as long as two GOPs are maintained in the stream buffer 3, even if a large amount of data is maintained in the video memory 7 and audio memory 10, the stoppage of images in seeking can be avoided.

In addition, in each of the aforementioned embodiments, MPEG audio, AC-3 and the like as well as linear PCM can be employed as a format of audio data.

In addition, a compression system is not limited to the MPEG2 system, and the MPEG1 system may be employed. Further, in the present embodiment, although there has been described an example when the DVD is employed as a storage medium having video and audio data recorded therein, the present invention is not limited to such arrangement. Furthermore, VCD (Video Compact Disc) or hard disc may be employed.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. P2000-14114 filed on Jan. 19, 2000 including the specification, claims, drawings and summary is incorporated herein by reference in its entirety.

What is claimed is:

1. An information reproduction apparatus comprising:
   a reading device which reads image information recorded in an information storage medium;
   a decoding device which decodes the image information read by the reading device;
   a storage device which holds the decoded image information decoded by the decoding device so that the decoded image information can be read therefrom and written therein repeatedly;
   an output controlling device which sequentially reads out and outputs the decoded image information in order of precedence at the time of writing the decoded image information while writing the decoded image information in a predetermined region of the storage device;
   a designating device which designates a repetitive reproduction start position indicating a start position of repetitive reproduction;
   a repetitive reproduction controlling device which controls a repetitive reproduction processing;
   a repetitive start instructing device which instructs the repetitive reproduction controlling device to begin to perform the repetitive reproduction processing; and
   a repetition reproduction range setting device which sets a repetition reproduction range that would include the decoded image information to be reproduced at one repetition reproduction and instructs the output controlling device to maintain the decoded image information in the repetition reproduction range, when the repetitive reproduction start position is designated by the designating device,
   wherein the repetitive reproduction controlling device instructs the output controlling device to output the decoded image information in the repetition reproduction range and to acquire the decoded image information subsequent to the repetition reproduction range, when the repetitive reproduction controlling device is instructed to begin to perform the repetitive reproduction processing by the repetitive reproduction start instructing device, wherein the output controlling device maintains the decoded image information in the repetition reproduction range in the storage device even when the decoded image information in the repetition reproduction range has been outputted.

2. The information reproduction apparatus according to claim 1, wherein:

the repetition reproduction range setting device sets a range from a target position on the storage device, from which the decoded image information is read at the time when the start position is designated, as the repetition reproduction range, and instructs the output controlling device to use an area except the repetition reproduction range for reading and writing area of the decoded image information, when the repetitive reproduction start position is designated, and the repetitive reproduction controlling device instructs the output controlling device to begin to read out the decoded image information from the target position on the storage device to an end of the repetition reproduction range when the repetitive reproduction controlling device is instructed to begin to perform the repetitive reproduction, and instructs the reading device to read the decoded image information, the decoding device to decode the read image information, and the output controlling device to write the decoded image information in the area except the repetition reproduction range, when the output controlling device is instructed to acquire the decoded image information subsequent to the repetition reproduction range.

3. The information reproduction apparatus according to claim 1, wherein the repetitive reproduction range setting device sets the size of the repetition reproduction range so that both reading information corresponding to the decoded image information subsequent to the repetition reproduction range in the reading device and decoding the read image information in the decoding device can be completed while the decoded image information in the repetition reproduction range is outputted.

4. The information reproduction apparatus according to claim 1, wherein:

the image information recorded on the information storage medium is video compression information that includes first image information for intra-frame encoding and second image information for performing forward and backward prediction; and the repetition reproduction range setting device instructs the output controlling device to maintain both the decoded image information that corresponds to one processing unit of the video compression information and the decoded image information that corresponds to the second image information immediately before the first image information that is first appeared in a processing unit subsequent to the one processing unit, as decoded image information in the repetition reproduction range.

5. An information reproduction method comprising the processes of:

reading image information recorded in an information storage medium;

decoding the read image information;

holding decoded image information in a storage device so that the decoded image information can be read therefrom and written therein repeatedly;

sequentially reading out and outputting the image information in order of precedence at the time of writing the decoded image information while writing the decoded image information in a predetermined region of the storage device;

designating a repetitive reproduction start position;

setting a repetition reproduction range that would include the decoded image information to be reproduced at one repetition reproduction when the start position of repetitive reproduction is designated;

maintaining the decoded image information in the repetition reproduction range when the start position of repetitive reproduction is designated;

providing an instruction to begin to perform repetitive reproduction;

outputting the decoded image information in the repetition reproduction range when the instruction is provided; and acquiring the decoded image information subsequent to the repetition reproduction range when the instruction is provided, wherein the decoded image information in the repetition reproduction range is maintained in the storage device even when the decoded image information in the repetition reproduction range has been outputted.

6. The information reproduction method according to claim 5, wherein the method further comprising the process of using an area except the repetition reproduction range for reading and writing area of the decoded image information when the repetitive reproduction start position is designated, and the process of setting the repetition reproduction range sets a range from a target position on the storage device, from which the decoded image information is read at the time when the start position is designated, as the repetition reproduction range, when the repetitive reproduction start position is designated, the process of outputting the decoded image information in the repetition reproduction range begins to read out the decoded image information from the target position on the storage device to an end of the repetition reproduction range, when the instruction is provided, the process of acquiring the decoded image information subsequent to the repetition reproduction range includes the processes of: reading the image information; decoding the read image information; and writing the decoded image information in the area except the repetition reproduction range.

7. The information reproduction method according to claim 5, wherein the process of setting the repetition reproduction range sets the size of the repetition reproduction range so that both reading image information corresponding to the decoded image information subsequent to the repetition reproduction range and decoding the read image information can be completed while the decoded image information in the repetition reproduction range is outputted.

8. The information reproduction method according to claim 5, wherein the image information recorded on the information storage medium is video compression information that includes first image information for intra-frame encoding and second image information for performing forward and backward prediction, and the method further comprising the process of maintaining both the decoded image information that corresponds to one processing unit of the video compression information and the decoded image information that corresponds to the second image information immediately before the first image information that is first appeared in a processing unit subsequent to the one processing unit, as the decoded image information in the repetition reproduction range, when the repetition reproduction range is set.

9. The information reproduction apparatus according to claim 4, wherein the video compression information is information in accordance with an MPEG2 (Moving Picture Expert Group 2) system.

10. The information reproduction apparatus according to claim 1, wherein the image information is image compression information.

11. The information reproduction apparatus according to claim 1, wherein:
the image information recorded in the information storage medium is video compression information that includes first image information for intra-frame encoding; and
the repetition reproduction range setting device instructs the output controlling device to maintain the decoded image information whose range is set in a range that includes up to a last data of one processing unit of the video compression information as decoded image information in the repetition reproduction range.

12. The information reproduction apparatus according to claim 11, wherein the video compression information is information in accordance with an MPEG2 (Moving Picture Expert Group 2) system.

13. The information reproduction method according to claim 8, wherein the video compression information is information in accordance with an MPEG2 (Moving Picture Expert Group 2) system.

14. The information reproduction method according to claim 5, wherein the image information is image compression information.

15. The information reproduction method according to claim 5, wherein:
the image information recorded in the information storage medium is video compression information that includes first image information for intra-frame encoding; and
the repetition reproduction range setting device instructs the output controlling device to maintain the decoded image information whose range is set in a range that includes up to a last data of one processing unit of the video compression information as decoded image information in the repetition reproduction range.

16. The information reproduction method according to claim 15, wherein the video compression information is information in accordance with an MPEG2 (Moving Picture Expert Group 2) system.

17. An information reproduction apparatus comprising:
a reading circuit that reads image information recorded in an information storage medium; and
a control circuit,
wherein said control circuit:
designates a repetitive reproduction start position indicating a start position of repetitive reproduction for a decoded image information that is written in a predetermined region of the storage device,
controls a repetitive reproduction processing,
performs the repetitive reproduction processing,
sets a repetition reproduction range that would include the decoded image information to be reproduced at one repetition reproduction,
maintains the decoded image information in the repetition reproduction range, when the repetitive reproduction start position is designated, and
outputs the decoded image information in the repetition reproduction range and acquires the decoded image information subsequent to the repetition reproduction range, when said control circuit begins to perform the repetitive reproduction processing,
wherein the control circuit maintains the decoded image information in the repetition reproduction range in the storage device even when the decoded image information in the repetition reproduction range has been outputted.

18. An information reproduction method comprising:
designating a repetitive reproduction start position for a decoded image information that is written in a predetermined region of a storage device;
setting a repetition reproduction range that would include the decoded image information to be reproduced at one repetition reproduction when the start position of repetitive reproduction is designated;
maintaining the decoded image information in the repetition reproduction range when the start position of repetitive reproduction is designated;
providing an instruction to begin to perform repetitive reproduction;
outputting the decoded image information in the repetition reproduction range when the instruction is provided; and
acquiring the decoded image information subsequent to the repetition reproduction range when the instruction is provided,
wherein the decoded image information in the repetition reproduction range is maintained in the storage device even if once the decoded image information in the repetition reproduction range has been outputted.

* * * * *